INVENTORS
CHARLES R. DAVIDSON JR and
WILLIAM P. MITCHELL
BY Oscar Spencer
ATTORNEY

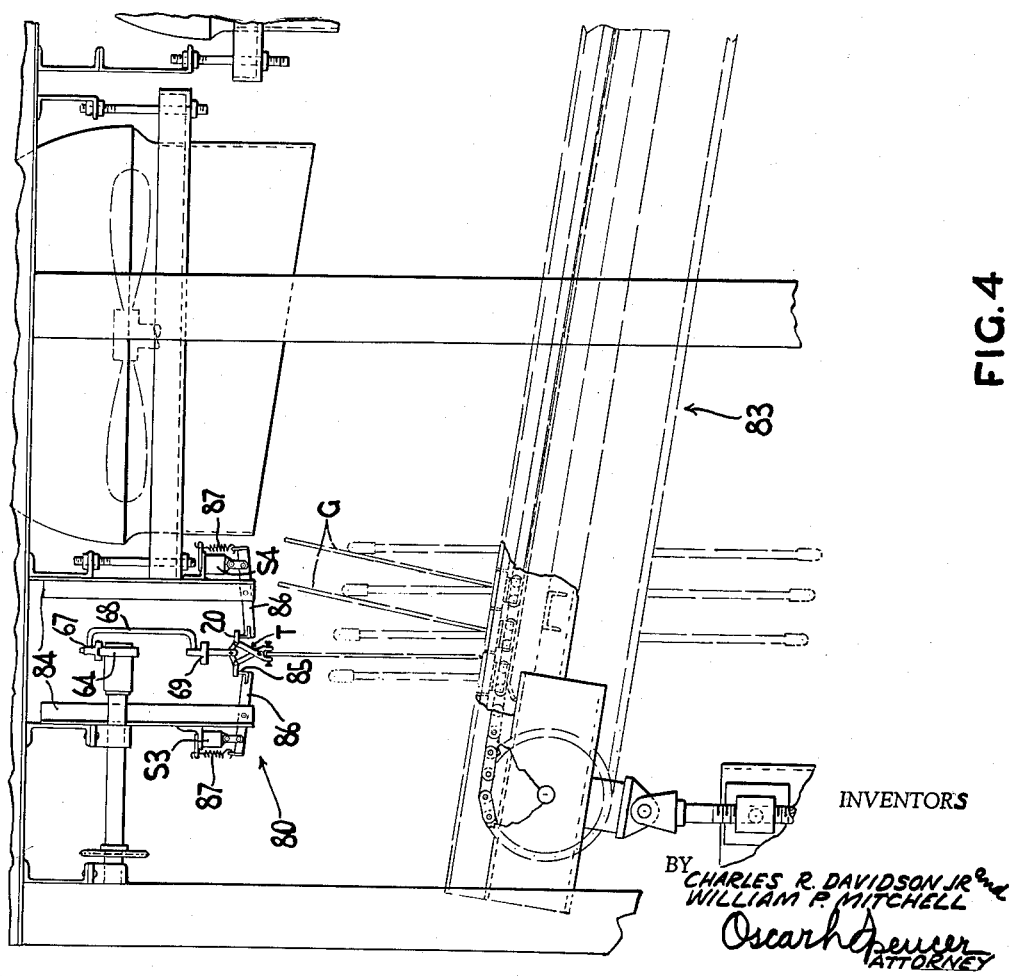

United States Patent Office 3,084,969
Patented Apr. 9, 1963

3,084,969
HANDLING RIGID SHEET ARTICLES
Charles R. Davidson, Jr., Natrona Heights, and William P. Mitchell, Brookline, Pa., assignors to Pittsburgh Plate Glass Company, a corporation of Pennsylvania
Filed Apr. 16, 1959, Ser. No. 806,956
2 Claim. (Cl. 294—118)

This application relates to handling rigid sheet articles, and particularly concerns novel suspension tong construction. Such construction has applicability in apparatus described and claimed in our divisional application Serial No. 166,183, filed January 15, 1962, for automatically loading rigid sheet articles into tongs and then unloading the articles after they have been transferred. The present invention has special utility in the automatic handling of various sizes of glass sheets precut to desired outlines and previously washed and dried so that they may be tempered and/or coated without requiring handling by a human hand.

Previous to the present invention, glass sheets were removed manually from the grip imposed by the gripping tongs.

Many disadvantages are present in the former glass handling technique. First of all, manual unloading is quite expensive because of high labor costs. Secondly, manual handling causes shrinkage due to breakage. Thirdly, manual operations are not conducive to uniform treatment, a desideratum of mass production.

The present invention will be described as it is used in apparatus which provides automatic handling of glass sheets that previously have been cut to outline, their edges abraded, their corners chamfered by seaming, and washed and dried. The benefits derived from the present invention will be understood better after studying the description of an illustrative embodiment of the invention which follows and which is made for the purpose of illustration rather than limitation. Reference to the latter may be obtained from studying the accompanying claims.

In the drawings forming part of the description of an illustrative embodiment,

FIG. 4 is a fragmentary end view of an unloading station of the apparatus of our divisional application Serial No. 166,183 showing how tongs constructed according to the presently claimed invention are disengaged from gripping engagement with a glass sheet automatically.

Figure 1:
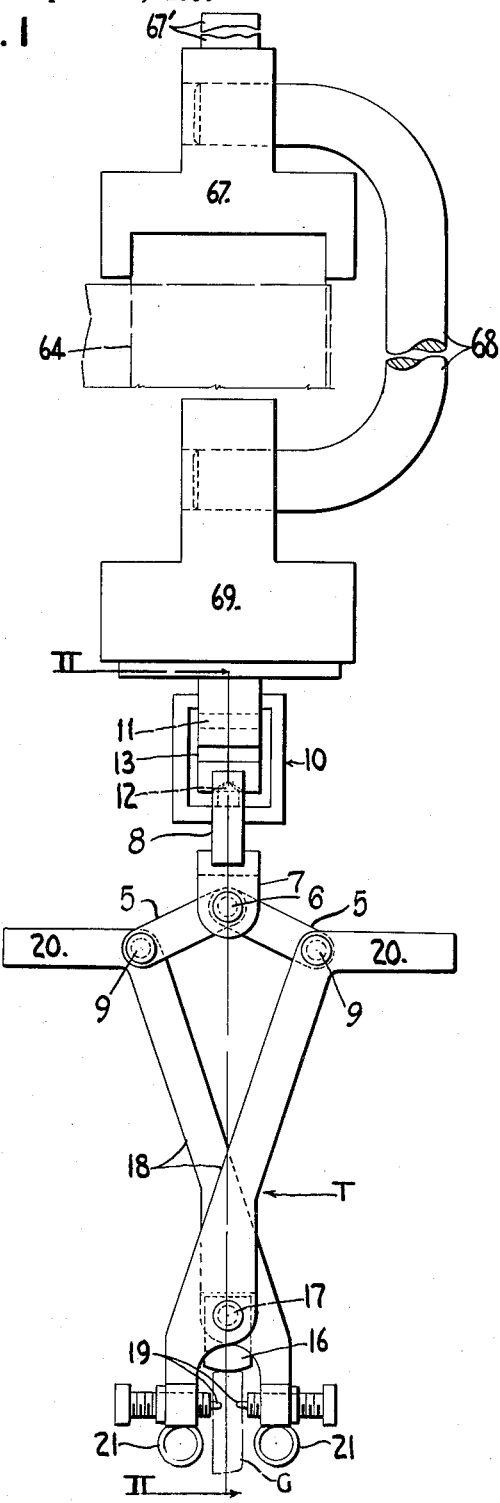
FIGURE 1 is an enlarged fragmentary elevation of a pair of tongs specially constructed for use in the present invention for gripping glass sheets and particularly useful to secure automatic loading and unloading. Parts of the carriage are removed to show the tongs in as large a scale as possible.
Figure 2:
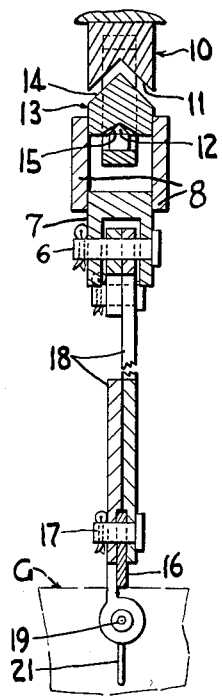
FIGURE 2 is a fragmentary sectional view taken along the lines II—II of FIG. 1.
Figure 3:
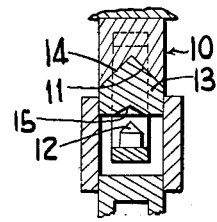
FIG. 3 is a view similar to FIG. 2 showing only a portion of the structure of FIG. 2 and illustrating how the tongs are locked in position while receiving a glass sheet.

Apparatus employing the present invention utilizes a plurality of carriages C, each provided with at least one bracket member 10 fixed to the bottom thereof. The bracket members each have an upper portion with a downwardly facing grooved surface 11 and a lower portion having an upwardly pointed member 12 of conical shape spaced below the grooved surface 11. A wedge shaped member 13 is constructed to have a pointed upper surface 14 and a conically grooved bottom surface 15, and arranged for vertical movement between an upper position wherein its upper pointed surface 14 locks into grooved surface 11 and a lowered position wherein its bottom conically recessed surface 15 pivots freely about pointed member 12. This free pivoting is possible because the conical recess of surface 15 has a larger apex angle than that of pointed member 12.

A pair of tongs T are pivoted with respect to each wedge-shaped member 13 and hangs down therefrom. The tongs T include a stop member 16 pivoted to a common hinge pin 17 for the tong arms 18. The latter, in turn, are apertured near their bottom to receive opposed tong points 19 which are adapted to grip a glass sheet G therebetween, while additional extension arms 20 extend horizontally outwardly of the upper extremities of the tong arms 18 to facilitate unloading as will be explained in greater detail later. Guide members 21, which insure that the glass is properly oriented into the tongs T on loading, are attached to the bottom of the tong arms 18. Tongs T also include a pair of upper links 5 pivoted to one another at their upper portions through a common link pin 6 carried by a clevis 7. The latter is rigidly attached to the wedge shaped member 13 through connector plates 8. Additional pins 9 serve to pivotally connect the bottom portion of one of the upper links 5 to the upper portion of one of the tong arms 18 and the bottom portion of the other upper link 5 to the upper portion of the other tong arm 18.

Each carriage C contains a superstructure 67 that rides on conveyor rolls 64, a connector 68 of C-shaped construction and a bottom portion 69 which carries the tongs T.

Control circuitry insures that each carriage C is moved into proper registry at an unloading station 80 with a peg conveyor 83 located below the area where the carriage conveyor passes between support posts 84, which are secured to the apparatus supporting structure.

The extension arms 20 are constructed and arranged for alignment with a pair of lifting arms 85, each interconnecting levers 86 actuated by solenoids S3 and S4 to pivot relative to support posts 84 so that the lifting arms 85 move in substatially vertical paths flanking the vertical plane intersecting carriage conveyor CC into an upward position to lift extension arms 20 simultaneously and cause tongs T to release their grip on the glass sheets by urging the glass gripping members or tong points 19 to move away from one another. Springs 87 normally urge the levers 86 to pivot downwardly in spaced relation below extension arms 20 to provide clearance for an incoming glass laden carriage C, and also to permit the carriage C after unloading its glass sheet to continue along the carriage conveyor.

Peg conveyor 83 extends transversely and obliquely downwardly from the unloading station 81 toward a packaging station (not shown).

While the above description has illustrated a typical embodiment capable of automatically unloading the treated glass sheets, it is understood that the principles of the present invention are capable of use in other treatments of glass besides tempering, such as coating the glass surface with or without prior heating. Furthermore, the aspects of the present invention relating to automatic unloading are also susceptible of use in handling articles of rigid sheet material other than glass with a considerable savings in labor cost resulting. In other words, the present invention involves handling and transferring rigid sheet material and is especially suitable, though not limited, to the automatic handling of glass sheets for tempering. In fact, the suspension tongs described hereinabove may be constructed without the special locking device 11, 14, but including the special extension arms 20 within the purview of the present invention. Tongs so modified may require manual loading, but are capable of automatic unloading.

The present invention is also susceptible of use in handling rigid sheets for dipping, coating, passing through vats, and other containers holding materials suitable for treating rigid sheets for pickling, cleaning, washing, drying, painting, annealing and other uses that will become apparent in the light of the present disclosure. Also, it is possible that the various treatments for rigid sheets of glass and other materials may be conducted in an atmosphere other than a container and having the necessary pressure, temperature and other controls required for such treatment.

This disclosure includes structural details of the conveyor system which are claimed in application Serial No. 166,183, filed January 15, 1962. The form of the invention shown and described in this disclosure represents an illustrative preferred embodiment thereof. It is understood that various changes may be made without departing from the spirit of the invention as defined in the claimed subject matter which follows:

What is claimed is:

1. In apparatus for gripping flat rigid sheets comprising a tong support carriage, tongs suspended from said carriage, said tongs comprising a common link pin, a pair of upper links pivoted to one another at their upper ends through said common link pin, a pair of tong arms, a pair of additional pins, one of said additional pins pivotally connecting the bottom portion of one of said upper links to the upper portion of one of said tong arms and the other of said additional pins pivotally connecting the bottom portion of the other of said upper links to the upper portion of the other of said tong arms, a common hinge pin pivotally interconnecting said tong arms to one another intermediate their ends, opposing tong points carried by said tong arms below said common hinge pin, the improvement comprising means on said carriage connected to said common link pin to prevent upward lifting of said common link pin relative to said means on said carriage and an extension arm extending outwardly from each of said tong arms above said common hinge pin, said outwardly extending arms being adapted for upward lifting by a pair of lifting arms operating in unison to cause the tong points to separate from each other.

2. In suspension tongs for gripping glass sheets comprising a common link pin, a pair of upper links pivoted to one another at their upper ends through said common link pin, a pair of tong arms, a pair of additional pins, one of said additional pins pivotally connecting the bottom portion of one of said upper links to the upper portion of one of said tong arms and the other of said additional pins pivotally connecting the bottom portion of the other of said upper links to the upper portion of the other of said tong arms, a common hinge pin pivotally interconnecting said tong arms to one another intermediate their ends, means for gripping the opposite surfaces of a glass sheet therebetween carried by said tong arms below said common hinge pin, said upper links and said tong arms being capable of easy pivotal movement about said pins, thereby causing said gripping means to move toward and away from one another in response to such movement when said common link pin is held in a fixed horizontal plane, the improvement comprising an extension arm extending outwardly from each of said tong arms above said common hinge pin, said outwardly extending arms being adapted for simultaneous upward lifting by a pair of lifting arms operating in unison to promote said easy pivotal movement to separate said gripping means from one another.

References Cited in the file of this patent

UNITED STATES PATENTS

| | | |
|---|---|---|
| 1,480,820 | Henrickson | Jan. 15, 1924 |
| 1,814,107 | Zavatkay | July 14, 1931 |
| 1,983,755 | Heichert | Dec. 11, 1934 |
| 2,343,521 | Benning | Mar. 7, 1944 |
| 2,370,381 | Vaughan | Feb. 27, 1945 |
| 2,476,169 | White | July 12, 1949 |
| 2,523,025 | Jeppson | Sept. 19, 1950 |
| 2,546,374 | Rayburn | Mar. 27, 1951 |
| 2,736,600 | Carlson | Feb. 28, 1956 |
| 2,863,571 | Foley | Dec. 8, 1958 |
| 2,872,057 | Wagner | Feb. 3, 1959 |
| 2,895,588 | Van Marle | July 21, 1959 |
| 2,906,555 | Heppenstall | Sept. 29, 1959 |
| 2,991,114 | Robinson | July 4, 1961 |